United States Patent
Breyer

(10) Patent No.: US 9,353,897 B2
(45) Date of Patent: May 31, 2016

(54) BAYONET FASTENING

(75) Inventor: Markus Breyer, Radolfzell (DE)

(73) Assignee: Georg Fischer JRG AG, Sissach (CH)

( * ) Notice: Subject to any disclaimer, the term of this patent is extended or adjusted under 35 U.S.C. 154(b) by 161 days.

(21) Appl. No.: 14/117,226

(22) PCT Filed: May 4, 2012

(86) PCT No.: PCT/EP2012/058174
§ 371 (c)(1),
(2), (4) Date: Nov. 12, 2013

(87) PCT Pub. No.: WO2012/156210
PCT Pub. Date: Nov. 22, 2012

(65) Prior Publication Data
US 2014/0062084 A1 Mar. 6, 2014

(30) Foreign Application Priority Data
May 13, 2011 (EP) .................................. 11165978

(51) Int. Cl.
*F16L 21/00* (2006.01)
*F16L 37/107* (2006.01)
*F16L 37/248* (2006.01)
*F16L 41/03* (2006.01)
*F16L 55/115* (2006.01)

(52) U.S. Cl.
CPC ............. *F16L 37/107* (2013.01); *F16L 37/248* (2013.01); *F16L 41/03* (2013.01); *F16L 55/1155* (2013.01)

(58) Field of Classification Search
USPC .................. 285/402, 921, 403, 414, 415, 308
See application file for complete search history.

(56) References Cited

U.S. PATENT DOCUMENTS

| | | | |
|---|---|---|---|
| 3,439,944 A * | 4/1969 | Leutenegger | F16L 37/0842 285/321 |
| 6,102,448 A * | 8/2000 | Fixemer et al. | 285/330 |
| 6,419,281 B1 | 7/2002 | Salomon-Bahls et al. | |
| 6,672,628 B2 * | 1/2004 | Thomas | F16L 37/1225 285/148.27 |
| 8,632,104 B2 * | 1/2014 | Horikawa et al. | 285/377 |

FOREIGN PATENT DOCUMENTS

| | | |
|---|---|---|
| DE | 20120157 U1 | 4/2002 |
| DE | 102005058161 A1 | 6/2007 |
| EP | 1106896 A1 | 6/2001 |
| EP | 2228582 A1 | 9/2010 |
| GB | 866626 A | 4/1961 |
| JP | 2004044619 A | 2/2012 |

* cited by examiner

*Primary Examiner* — Aaron Dunwoody
(74) *Attorney, Agent, or Firm* — Bachman & LaPointe, P.C.

(57) ABSTRACT

A bayonet fastening which can be used to connect two pipeline components, in particular connection elements. The pipeline components which are to be connected respectively comprise a cylindrical receiving part (1) and the second pipeline component comprises an insertion part (2) which can be introduced into the receiving part. A clamping ring (3) is arranged on the outer diameter of the insertion part and the receiving part can be pushed onto said clamping ring. The bayonet fastening can be locked by rotating the receiving part and the insertion part in relation to one another.

11 Claims, 5 Drawing Sheets

BAYONET FASTENING

BACKGROUND OF THE INVENTION

The invention relates to a bayonet fastening suitable for connecting two pipeline components, in particular connecting elements, wherein the pipeline components to be connected comprise a cylindrical receiving part and the second pipeline component has an insertion part which can be inserted in the receiving part.

Pipelines in particular in the area of drinking water are produced today in many cases from plastics material, with the exception of the connecting elements such as, for example, distributors, valves, etc., these being produced, as a rule, from a metal material. Irrespective of whether the connecting element is produced from a copper alloy, a different metal substance or plastics material, the connecting elements are usually screw-connected to the pipeline, in the case of plastics material threads an additional sealing element such as, for example, an O-ring seal being also incorporated as the plastics material thread itself is not sealing or is not sufficient for sealing. In order to obtain approval for use of the drinking water, the connecting elements have consequently to be connected to the system in accordance with DVGW W 534 (German Association for Gas and Water Applications) and have a sealing connecting thread which meets the prerequisites of DIN Standard EN 10226-1, which does not permit connection to the drinking water system by means of a sealing plastic materials thread. Installation by means of a threaded connection is very expensive as the thread has to be provided with a sealing compound prior to screw-connection in order then to be able to be screw-connected in a sealing manner. In addition, a tool is required for the assembly of a connecting element which has a thread for fastening, as well as also the tightening torque in the case of such connections is always different, which is a further disadvantage of a screw-connection.

In addition, connections also exist between connecting elements and pipelines which dispense with a thread and are connectable together by means of a type of quick acting closure. EP 1 106 896 B1 discloses a plug-in connection which latches-in and is locked by pushing the components together in an axial manner, the plug-in connection being radially resilient or freely rotatable.

DE 10 2005 058 161 A1 describes a quick acting closure for the area of plumbing for connecting a line element and a connecting piece, the connection being generated by an annular body with a modifiable cross section which latches into a groove. The connecting parts are fixed together axially as a result, but cannot be rotated freely in a radial manner with respect to one another.

The disadvantage of the two previously mentioned documents is that the connections are not positionable in a radial manner and consequently do not achieve radial positive locking. In addition, when coupling the plug-in connection from EP 1 106 896 B1, it is not possible to ascertain whether the fastening is correctly latched in. A further weak point of the plug-in connection is that as a result of the lack of radial positive locking, the connection can be opened in an unwanted manner by vibrations.

EP 2 228 582 A1 discloses a liquid distributor made of plastics materials which is connected to the pipeline by means of a slotted ring. Disadvantages of this solution are the high production costs and the inconvenient method of assembly.

It is the object of the invention to propose an apparatus which enables a simple and rapidly mountable connection between the pipeline and the pipeline component as well as provides a reliable, tight connection which corresponds to approval regulations DVG W 534 and also withstands the required pressure and tensile test.

SUMMARY OF THE INVENTION

The object is achieved by providing a clamping ring, onto which a receiving part can be slipped, arranged on an outside diameter of the insertion part and a bayonet fastening lockable by rotating the receiving part and the insertion part in relation to one another.

For example, the one end of a pipe component, in particular a connecting element such as distributors, valves, etc., is realized as an insertion part, this means that the outside contour is realized such that the clamping ring is able to be arranged thereon in a non-displaceable manner, the construction of a bayonet fastening is illustrated by way of FIG. 1. So that the clamping ring is not displaced on the insertion part, it is arranged in a groove, the width of which corresponds to the clamping ring or clamping segment, which fixes the clamping ring in the direction of the longitudinal axis. In order also to avoid the clamping ring rotating, the clamping segment has at least one latching tooth which extends into a recess which is arranged on the outside diameter of the insertion part, as a result of which the coupling operation, that is to say the telescoping of the receiving and insertion part and the subsequent rotating, is made possible without the clamping ring or the clamping segments rotating. So that the connecting element, for example a distributor, is able to be aligned individually, the insertion part has several recesses along the circumference, as a result of which the clamping segments can be positioned in a different alignment and nevertheless enable locking against rotation during the coupling. To align the clamping segments or the bayonet fastening it is necessary for the latching tooth to be flexible, in order to achieve this a groove, which is arranged in the region of the latching tooth, is situated on the clamping segment. The groove makes it possible for the latching tooth or its position to be able to be modified slightly in a resilient manner and as a result for the clamping ring to be rotated. When a sufficiently large torque is generated, the latching tooth is rotated into the recess which is located close to it, which is able to be repeated as often as required until the pipeline component or the connecting element has the desired position. Said operation for alignment is not carried out until the parts are coupled together and the bayonet fastening is locked. The pipeline component is then able to be aligned in any arbitrary direction. The important factor in the case of said apparatus, however, is that in order to obtain a subsequent alignment, the torque which is applied to align the connecting element or the bayonet fastening has to be greater than that which serves for locking and also for opening the bayonet fastening. As a result, the bayonet fastening and accordingly the pipeline component can be aligned in an arbitrary manner or according to the recesses along the circumference of the insertion part into which the latching tooth latches, which makes the pipeline component and the bayonet fastening rotatable about 360°.

The recesses positioned in part on the inside diameter of the receiving part ensure that the insertion part with the clamping ring pre-assembled thereon is able to be inserted into the receiving part. The outside diameter of the latching lug of the clamping ring is realized such that it is slightly smaller than the inside diameter of the receiving part at the partial recesses, but larger than the inside diameter of the remaining region of the receiving part. It is possible to push the receiving part and the insertion part together as far as up to the stop flange of the insertion part. When said position is reached, the parts have to be rotated with respect to one another until the locking lug in rotated into the latching opening.

A preferred embodiment of the bayonet fastening is to produce the clamping ring from at least two clamping segments.

The clamping ring which consists of clamping segments has in each case per clamping segment at least one latching lug which, in the mounted state, latches in the latching opening of the receiving part. The geometry of the latching lug is to be matched individually to the size and the application of the fastening. The latching lug preferably has a bar which bends in a resilient manner during the rotating or coupling operation and as a result is also able to be inserted into the receiving part. It prevents the unintentional opening in the locked position by also having a positive radial fit with the latching opening in addition to the positive axial fit which is provided by a bayonet fastening. In order to open the bayonet fastening in a conscious manner, the bar has to be pressed down in order, in this manner, to overcome the positive radial fit and the receiving and insertion part are uncoupled again by being rotated and subsequently removed.

A further development of the bayonet fastening is that a clamping segment has connecting bars for connecting the individual clamping segments to form a ring. By joining the clamping segments together, the bars extend into the slip-on surfaces provided for this purpose on the connecting clamping segment and are realized such that the clamping ring, once the clamping segments have been joined together, is sturdy in itself and the clamping segments are easily interlocked.

The invention is distinguished further in that a clamping ring is assembled from identical clamping segments. This is a decisive advantage for the economy of such a fastening as such parts are preferably produced using the injection molding method and, as a result, only one mold is required, the production of which is known to be very cost-intensive.

A further advantage is that the clamping segment covers a circle sector of in excess of 180°, the circle sector has preferably 210°-230°. This, on the one hand, enables simple assembly as the clamping segment, which is mounted as the first part on the insertion part, is lightly fixed and does not have to be fixedly held in a constant manner and in addition the overlap between the two clamping segments gives the clamping ring cohesion and stabilizes the ring in itself.

In order to obtain optimum positioning as well as stability of the clamping ring, the bars which are arranged on the clamping segment extend into the slip-on surface provided for this purpose when the clamping segments are joined together to form a ring.

The clamping segments and also the pipeline components are produced from plastics material, preferably from PPSU or polyamide. The clamping segments and the pipeline components not having to be produced from the same plastics material.

BRIEF DESCRIPTION OF THE DRAWINGS

One exemplary embodiment of the invention is described by way of the figures, the invention not being limited to only the exemplary embodiment, in which.

DETAILED DESCRIPTION

Figure 1:
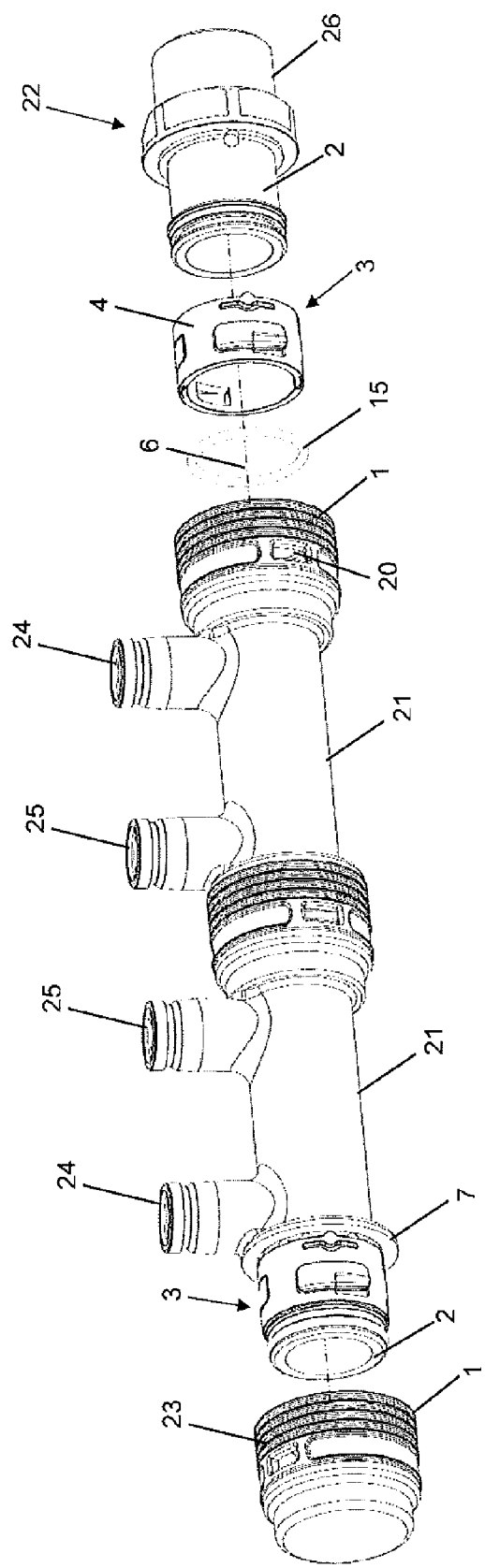
FIG. 1 shows an exploded view of assembled pipeline components, in particular two distributors which are coupled together by means of a bayonet fastening as claimed in the invention.

FIG. 1 shows, among other things, on which different pipeline components the bayonet fastening as claimed in the invention can be used, the bayonet fastening also being used on further pipeline components which are not shown.

The receiving part 1 serves for receiving the insertion part 2. A central axis 6 is shown. In FIG. 1, the transition screw connection 22 is realized such that a thread (not shown) is arranged on the one connection side 26 and the other side of the transition screw connection 22 is realized as an insertion part 2 of a bayonet fastening. The transition screw connection 22 is preferably produced from a metal material as the approval regulations demand a metal, thread-sealing connection of a pipeline component, such as, for example, a distributor 21, to the pipeline system and this is fulfilled in this way if the connecting pipeline components are of plastics material. The further pipeline components, such as, for example, distributors 21, can be coupled rapidly to the system by means of a bayonet fastening, as well as also connected together by way of a bayonet fastening as claimed in the invention, which has the great advantage that no further threads are present which have to be screwed together and correspondingly prepared beforehand. A seal 15, preferably an O-ring seal, serves for sealing the bayonet fastening. A distributor 21, which is realized on the one connection size as insertion part 2, on which the clamping segments 4 are assembled or pre-assembled, is shown in FIG. 1 as the pipeline component to be connected. The clamping ring 3 preferably consists of two clamping segments 4 which are coupled together and have light cohesion. As a result, pre-assembly on the insertion part 2 is easily possible.

In addition, a groove is situated on the insertion part 2 in order to mount a seal 15 on the circumference. An O-ring seal which is simple to mount is preferably used. The tightness of the bayonet fastening is ensured by means of the seal 15. The other connection side of the distributor 21 is realized as receiving part 1 into which a suitable insertion part 2 with a clamping ring 3 arranged thereon is able to be inserted in order to connect a desired pipeline component. A second distributor 21 is connected on the first distributor 21 in FIG. 1 as an exemplary embodiment. The bayonet fastening enables a compact connection technique such that the connecting pieces 25, which lie side by side but are in each case attached on a separate distributor 21, are at the same distance from one another as the connecting pieces 24, 25 which are arranged side by side on the same distributor 21, which is a great advantage for the connection of subsequent elements.

A further possibility for use of the bayonet fastening is to form a closure cap 23 as the receiving part 1. A closure plug which is realized as insertion part 2 also being conceivable. The closure cap 23 in FIG. 1, which is realized as receiving part 1, is slipped over the insertion part 2 with the clamping segments 4 mounted thereon and is subsequently locked. FIG. 1 shows a few variants of possible pipeline components which are connectable by means of a bayonet fastening, the range is however extendible in an unlimited manner.

Figure 2:
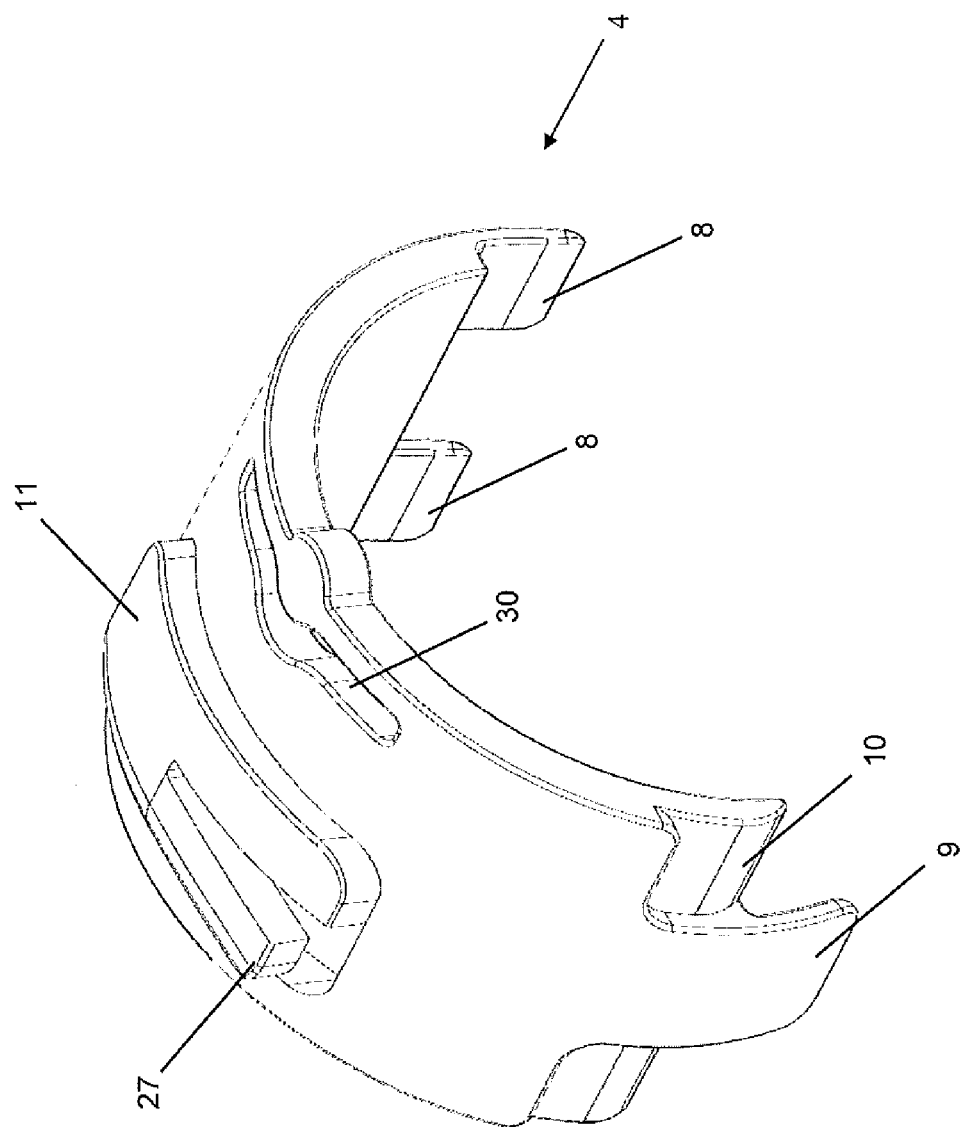
FIG. 2 shows a 3D view of a clamping segment.
Figure 3:
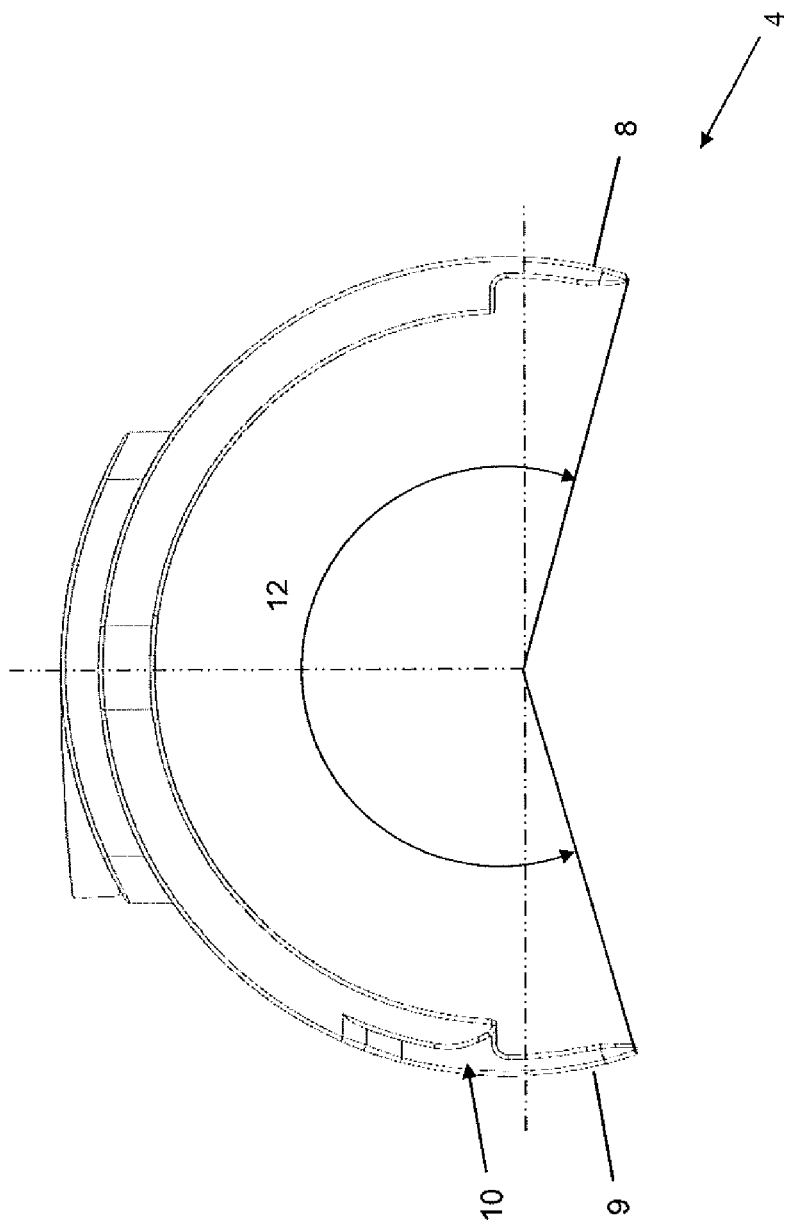
FIG. 3 shows a front view of a clamping segment.

Connecting bars 8, 9 are situated on the two ends on the clamping segment 4, which is shown in FIG. 2. When the clamping segments 4, preferably two, are joined together for form a clamping ring 3, the bars 8, 9 interlock. The bar 9 is situated on the one end of the clamping segment 4 in the center of the clamping segment 4, on the other end the bars 8 are arranged in each case on the end face and have a gap between them into which fits the connecting bar 9 of the second clamping segment 4, which is arranged centrally. Only one possible embodiment represents said connection type between the clamping segments 4, other connecting variants for clamping segments are equally imaginable. The connecting bars 8, 9 have a smaller wall thickness or a larger inside diameter than the remaining part of the clamping segment 4. This serves for the purpose of obtaining an optimum transition to the slip-on surface 10 which is arranged on the other clamping segment 4. In addition, the clamping segment 4 shown in FIG. 2 has a latching lug 11 which serves for latching in the latching opening 20 which is arranged in the receiving part 1. Each clamping segment 4 preferably has such a latching lug 11. The geometry of a latching lug 11 is formable in an individual manner. The present embodiment of the latching lug 11 provides a slotted latching lug 11. The bar 27 can be resiliently deformed when the parts are guided together and, as a result, enables the insertion of the parts during the locking process of the bayonet fastening. After rotation as far as up to achieving the locking position, in which the latching lug 11 latches into the latching opening 20, the bar 27 is deformed back again into the original position and with the latching opening 20 forms a positive-locking connection, which can be seen in FIG. 2. By standing out tangentially, the bar 27 prevents the bayonet fastening from opening in an unwanted manner. If the bayonet fastening has to be opened, the bar 27 must be pressed down in order, in this manner, to enable the bayonet fastening to rotate open. The clamping segment 4 extends over a circle sector 12 which is greater than 180°, which can be seen in FIG. 3. A circle sector 12 which lies within the range of between 210° and 230° is preferred. As a result, the mutual interlocking of the connecting bars 8, 9 of the clamping segments 4 is ensured, as well as light cohesion of the clamping ring 3. A further advantage is that the assembly is simple to carry out as one single clamping segment 4 remains bonded to the insertion part 2 by the size of the circle segment 12.

Figure 4:
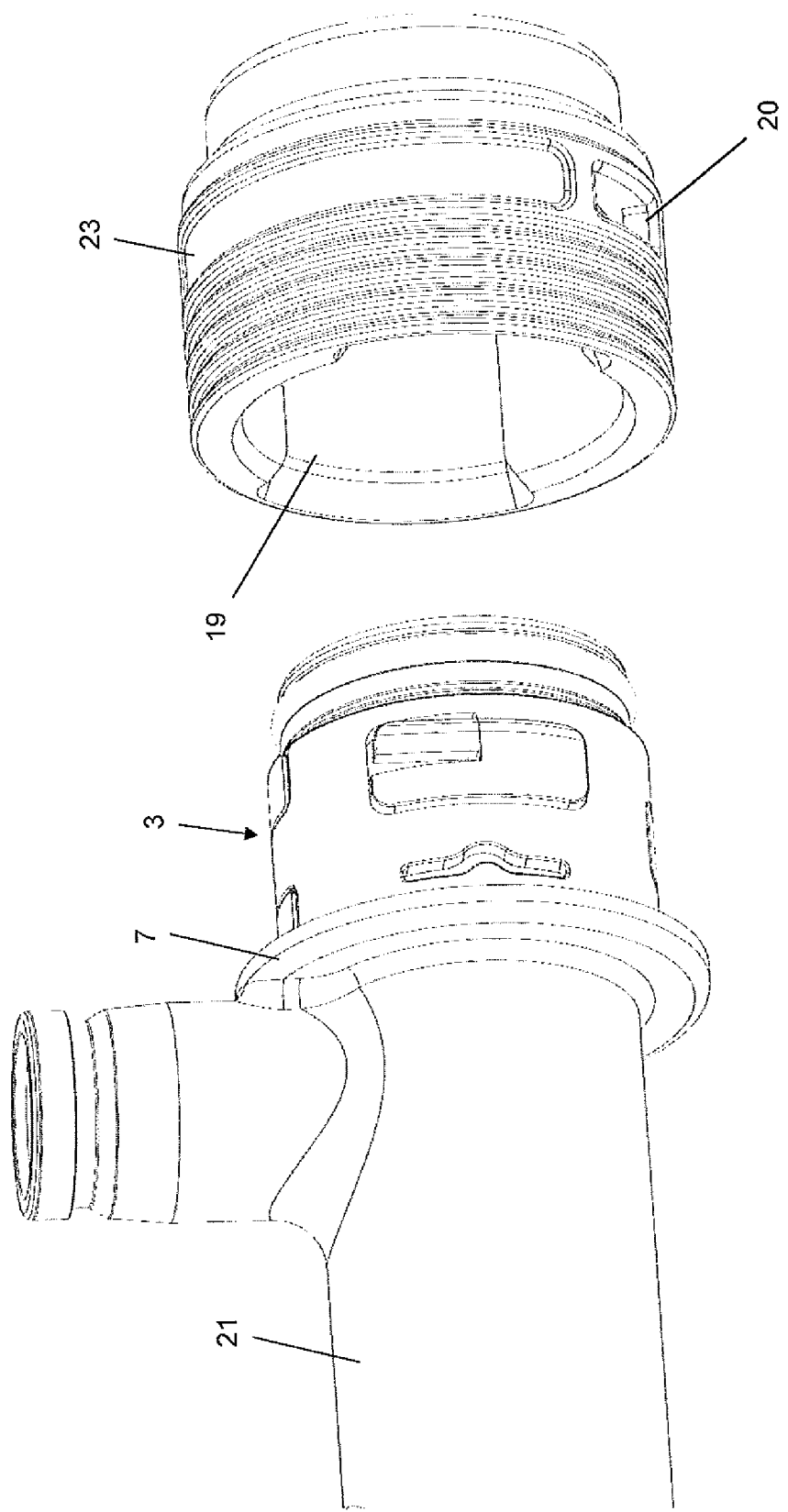
FIG. 4 shows a 3D view of an open bayonet fastening and FIG. 5 shows a 3D view of an open bayonet fastening in a further perspective.

It can be seen in FIG. 4 how a bayonet fastening is guided together and is subsequently locked. A distributor 21 on which an insertion part 2 is arranged is shown as the pipeline component in FIG. 4, however other components are also conceivable. The clamping segments 4 are pre-assembled to form a clamping ring 3 on the insertion part 2. The insertion part 2 with the mounted clamping ring 3 has to be aligned correspondingly with respect to the receiving part 1 prior to insertion such that the latching lug 11 comes to rest in the recess 19 of the receiving part 1, which makes it possible to slip in the insertion part 2 with pre-assembled clamping ring 3. For insertion, the bar 27 has to be pressed downward. It is pushed in until the receiving part 1 abuts against the stop flange 7. It is not possible to rotate the receiving part 1 and the insertion part 2 in relation to one another until said position as the form of the recess 19 is only admitted in this position. By means of the rotation in relation to one another, the latching lug 11 rotates into the corresponding latching opening 20 in which the bar 27 is able to open out back into its original form, and as a result, the unwanted opening of the fastening is avoided. The rotating for locking is only permitted in one direction by the shape or the development of the recess 19. The recesses 19 and the latching openings 20 are preferably arranged such that the angle of rotation for locking lies between 30° and 50°.

Figure 5:
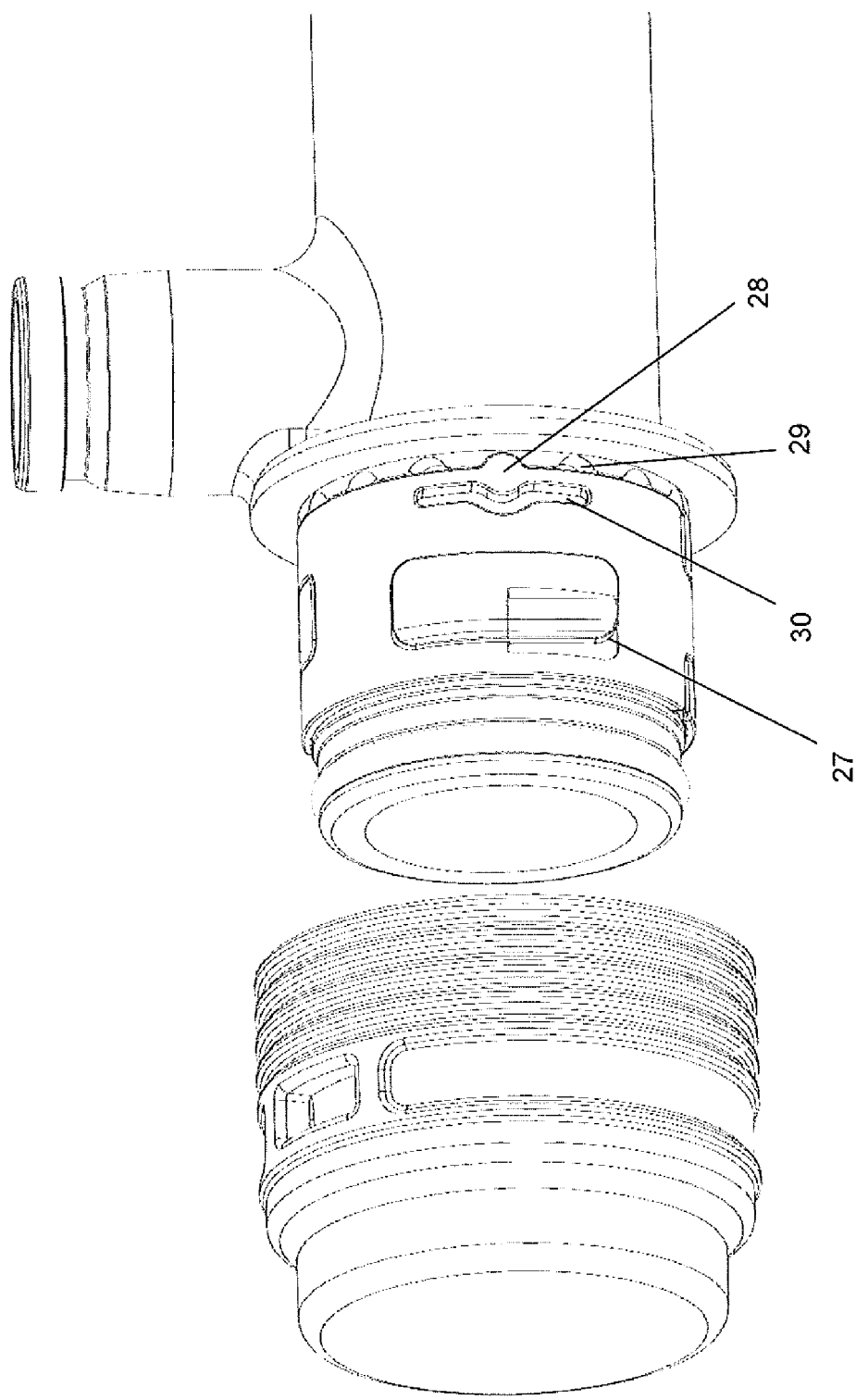

FIG. 5 shows an opened bayonet fastening in a further perspective, as a result of which it is possible to see the latching for positioning the clamping segments 4, for locking the rotation of the clamping segments 4 when guiding the insertion part 2 and receiving part 1 together and for subsequently aligning the pipeline components. The latching tooth 28 engages into the recess 29 in order to position, on the one hand, the clamping ring 3 or the respective clamping segment 4 and in order to fix the clamping ring 3 in such a manner that the assembly of the pipeline component or of the bayonet fastening is enabled without rotating the clamping segments 4 in their position. It is possible to align the pipeline component subsequently by means of the recesses 29 which are arranged on the circumference of the insertion part 2 by the locked bayonet fastening or the insertion part 2 and the receiving part 1 being rotated in relation to one another. By means of a sufficiently large torque which is applied, the latching tooth 28 jumps into the next recess 29. So that this does not happen during the locking operation, it is important for the torque required for this purpose to be greater than the torque which is applied for locking or unlocking. So that a subsequent alignment of the bayonet fastening or of the pipeline component, which can be effected in two directions of rotation, is achieved, the latching tooth 28 is developed in a resilient manner. This is achieved in the present embodiment by a groove 30, which gives the latching tooth 28 the required resilience, being arranged offset to the latching tooth 28 in the axial direction. Naturally said resilience of the latching tooth 28 can also be obtained by another design.

The invention claimed is:

1. A combination of two pipeline components, the combination comprising:
   a first pipeline component comprising a cylindrical receiving part;
   a second pipeline component having an insertion part which is inserted in the receiving part; and
   a clamping ring, onto which the receiving part is slipped, arranged on the outside diameter of the insertion part,
   wherein:
   the receiving part and the insertion part are shiftable axially and rotatable relative to one another for locking the first and second pipeline components via an axial shift and a rotation;
   the clamping ring comprises at least two clamping segments;
   at least one of the clamping segments has at least one bayonet fastener latching lug;
   the receiving part has at least one bayonet fastener recess receiving the at least one bayonet fastener latching lug in a locked condition and passing the at least one bayonet fastener latching lug during said axial shift and said rotation; and
   at least one of the clamping segments have at least one latching tooth which interacts with a corresponding latching recess on the insertion part.

2. The combination as claimed in claim 1, wherein the latching lug has a bar which, in the latched-in position, has a positive radial fit with a latching opening of the receiving part.

3. The combination as claimed in claim 1, wherein at least one of the clamping segments has connecting bars for connecting the at least two clamping segments to form the clamping ring.

4. The combination as claimed in claim 3, wherein the clamping segments, which are connected together to form the clamping ring, are identical.

5. The combination as claimed in claim 1, wherein at least one of the clamping segments have a circle sector which lies within the range of 210°- 230°.

6. The combination as claimed in claim 1, wherein the latching tooth is realized in a resilient manner.

7. The combination as claimed in claim 1, wherein the recess is arranged on a circumference of the insertion part.

8. The combination as claimed in claim 7, wherein said latching recess is one of a plurality of recesses are arranged along the circumference of the insertion part for aligning the pipeline components in an individual manner.

9. The combination as claimed in claim 1, wherein at least one of the clamping segments is produced from one of polyphenylsulfone (PPSU) and polyamide.

10. The combination as claimed in claim 1, wherein the pipeline components are distributors.

11. The combination as claimed in claim 1, wherein the pipeline components are produced from one of polyphenylsulfone (PPSU) and polyamide.

* * * * *